United States Patent
McCorkendale et al.

(10) Patent No.: US 10,791,116 B1
(45) Date of Patent: Sep. 29, 2020

(54) SYSTEMS AND METHODS FOR SECURING UNIVERSAL PLUG AND PLAY CONNECTIONS

(71) Applicant: Symantec Corporation, Mountain View, CA (US)

(72) Inventors: Bruce McCorkendale, Manhattan Beach, CA (US); Ramakrishnan Meenakshi Sundaram, Chennai (IN); Justin Harmon, Knoxville, TN (US); Srini Chillappa, San Ramon, CA (US)

(73) Assignee: NortonLifeLock Inc., Tempe, AZ (US)

( * ) Notice: Subject to any disclaimer, the term of this patent is extended or adjusted under 35 U.S.C. 154(b) by 403 days.

(21) Appl. No.: 15/281,126

(22) Filed: Sep. 30, 2016

(51) Int. Cl.
   *H04L 29/06* (2006.01)
   *H04L 12/24* (2006.01)
   *H04L 29/08* (2006.01)

(52) U.S. Cl.
   CPC ...... *H04L 63/0876* (2013.01); *H04L 41/0809* (2013.01); *H04L 63/1416* (2013.01); *H04L 63/20* (2013.01); *H04L 67/18* (2013.01); *H04L 67/327* (2013.01)

(58) Field of Classification Search
   CPC .......... H04L 63/0876; H04L 41/0809; H04L 63/1416; H04L 63/20; H04L 67/18; H04L 67/327
   See application file for complete search history.

(56) References Cited

U.S. PATENT DOCUMENTS

| | | | | |
|---|---|---|---|---|
| 2007/0039037 A1* | 2/2007 | Son | ...................... | H04L 41/0883 726/2 |
| 2007/0039039 A1* | 2/2007 | Gilbert | ................ | H04L 63/0876 726/4 |
| 2007/0233845 A1* | 10/2007 | Song | ................... | H04L 12/2818 709/223 |
| 2009/0304009 A1* | 12/2009 | Kolhi | .................. | H04L 63/0876 370/400 |

(Continued)

OTHER PUBLICATIONS

Brent A. Miller et al., "Home Networking with Universal Plug and Play," Dec. 2001 IEEE, pp. 104-109. (Year: 2001).*

(Continued)

*Primary Examiner* — Luu T Pham
*Assistant Examiner* — Canh Le
(74) *Attorney, Agent, or Firm* — FisherBroyles, LLP

(57) ABSTRACT

The disclosed computer-implemented method for securing Universal Plug and Play connections may include (1) detecting, by a network device within a local network, an attempt by a remote device to establish a connection with a client device within the local network via a UPnP protocol, (2) identifying a forwarding rule applied by the network device on the client device based at least in part on an identity of the client device, (3) determining at least one restriction placed on UPnP connections between the client device and remote devices by the forwarding rule, and then in response to determining the restriction placed on UPnP connections between the client device and remote devices by the forwarding rule, (4) enforcing the restriction on the connection (Continued)

attempted by the remote device with the client device via the UPnP protocol. Various other methods, systems, and computer-readable media are also disclosed.

15 Claims, 8 Drawing Sheets

(56) References Cited

U.S. PATENT DOCUMENTS

| | | | |
|---|---|---|---|
| 2010/0070636 A1* | 3/2010 | Skog | H04L 12/2834 709/228 |
| 2011/0082922 A1* | 4/2011 | Ahn | H04L 12/2805 709/223 |
| 2015/0045021 A1* | 2/2015 | Schlatter | H04W 48/20 455/434 |
| 2015/0207810 A1* | 7/2015 | Zheng | G06F 21/554 726/23 |
| 2015/0254438 A1* | 9/2015 | Odom | G06F 17/30 726/27 |
| 2016/0182565 A1* | 6/2016 | Salvador | H04L 63/20 726/1 |
| 2016/0381030 A1* | 12/2016 | Chillappa | H04L 63/102 726/11 |
| 2017/0126834 A1* | 5/2017 | Fransen | H04L 67/303 |
| 2018/0007055 A1* | 1/2018 | Infante-Lopez | H04W 4/80 |
| 2018/0034655 A1* | 2/2018 | Christopher | H04L 12/283 |

OTHER PUBLICATIONS

R. Ananthalakshmi Ammal et al., "An Intelligent, Context Aware Resource Discovery for Heterogeneous IP Networks," 2014 IEEE, pp. 105-110. (Year: 2014).*

Bruce McCorkendale, et al; Systems and Methods for Securing Universal Plug and Play Connections; U.S. Appl. No. 15/281,126; filed Sep. 30, 2016.

Srinivas Chillappa et al.; Router Based Securing of Internet of Things Devices on Local Area Networks; U.S. Appl. No. 14/747,896; filed Jun. 23, 2015.

Srinivas Chillappa et al.; Router Based Securing of Internet of Things Devices on Local Area Networks; Application No. PCT/US2016/035571; filed Jun. 2, 2016.

* cited by examiner

SYSTEMS AND METHODS FOR SECURING UNIVERSAL PLUG AND PLAY CONNECTIONS

BACKGROUND

Universal Plug and Play (UPnP) is often used by devices within home networks to automatically open and configure router ports that connect those devices to the Internet. For example, a surveillance cam may direct a router within a home network to open and configure a port to facilitate streaming a video feed from the surveillance cam via UPnP. In this example, a remote device located outside the home network may be able to access and/or view the video feed by way of the UPnP port on the router without much in the way of security and/or authentication. As a result, a malicious user may be able to infiltrate the home network via the UPnP port on the router and then access and/or view the video feed by scanning the router.

Unfortunately, this lack of security and/or authentication may make users of UPnP devices susceptible to hacking and/or attacks. The instant disclosure, therefore, identifies and addresses a need for systems and methods for securing UPnP connections.

SUMMARY

As will be described in greater detail below, the instant disclosure describes various systems and methods for securing UPnP connections. In one example, a method for securing UPnP connections may include (1) detecting, by a network device within a local network, an attempt by a remote device to establish a connection with a client device within the local network via a UPnP protocol, (2) identifying a forwarding rule applied by the network device on the client device based at least in part on an identity of the client device, (3) determining at least one restriction placed on UPnP connections between the client device and remote devices by the forwarding rule, and then in response to determining the restriction placed on UPnP connections between the client device and remote devices by the forwarding rule, (4) enforcing the restriction on the connection attempted by the remote device with the client device via the UPnP protocol.

In some examples, the method may also include receiving a request from the client device to open a certain port to facilitate UPnP connections between the client device and remote devices. In one example, the method may further include determining the identity of the client device and then identifying the forwarding rule to be applied to the client device based at least in part on the identity of the client device. Additionally or alternatively, the method may include applying the forwarding rule on the client device such that any UPnP connections with the client device are subject to the restriction.

In some examples, the method may also include identifying a context of an application that initiated the request to open the certain port. Additionally or alternatively, the method may include identifying the forwarding rule based at least in part on the context of the application that initiated the request to open the certain port.

In some examples, the method may also include receiving a request from the client device to open a certain port to facilitate UPnP connections between the client device and remote devices. In one example, the method may further include transmitting, to an administrator of the local network, a notification indicating that the client device is requesting to open the certain port to facilitate UPnP connections. Additionally or alternatively, the method may include receiving, from the remote device, a response indicating whether to satisfy the request to open the certain port to facilitate UPnP connections.

In some examples, the response may instruct the network device to satisfy the request by opening the certain port to facilitate UPnP connections. In such examples, the method may also include satisfying the request by opening the certain port to facilitate UPnP connections based at least in part on the response.

In some examples, the response may instruct the network device to deny the request by refusing to open the certain port for UPnP connections. In such examples, the method may also include refusing to open the certain port for UPnP connections based at least in part on the response.

In some examples, the response may identify the restriction placed on UPnP connections between the client device and remote devices. In such examples, the method may also include placing the restriction on UPnP connections between the client device and remote devices based at least in part on the response.

In some examples, the notification transmitted to the administrator may specify the identity of the client device, the forwarding rule that corresponds to the identity of the client device, the context of the application that initiated the request on the client device, and/or an indication as to whether the client device is expected to initiate requests to open ports to facilitate UPnP connections.

In some examples, the identity of the client device may include and/or represent a technology category of the client device, a make or model of the client device, at least one feature of the client device, an address of the client device, variations or combinations of one or more of the same, or any other suitable identity.

In some examples, the method may also include determining that the restriction prevents any UPnP connections between the client device and remote devices. Additionally or alternatively, the method may include preventing the connection between the client device and the remote device from being established.

In some examples, the method may also include determining that the restriction prevents UPnP connections between the client device and remote devices located in a certain geolocation. In such examples, the method may further include determining that the remote device attempting to establish the connection with the client device is located in the certain geolocation and then preventing the connection between the client device and the remote device from being established due at least in part to the certain geolocation of the remote device.

In some examples, the method may also include determining that the restriction prevents UPnP connections between the client device and remote devices with blacklisted addresses. In such examples, the method may further include determining that the remote device attempting to establish the connection with the client device has a blacklisted address and then preventing the connection between the client device and the remote device from being established due at least in part to the remote device having the blacklisted address.

In some examples, the method may also include determining that the restriction prevents UPnP connections between the client device and remote devices whose reputations do not reach a certain threshold. In such examples, the method may further include determining that the remote device attempting to establish the connection with the client device has a reputation that does not reach the certain threshold and then preventing the connection between the client device and the remote device from being established due at least in part to the remote device having the reputation that does not reach the certain threshold.

In some examples, the method may also include creating, for client devices of a certain type, a default profile that includes the forwarding rule. In such examples, the method may further include determining that the client device is of the certain type. Additionally or alternatively, the method may include applying the default profile to the connection between the client device and the remote device in response to determining that the client device is of the certain type. As an example, the type of client device may include and/or represent a webcam device and/or a gaming device.

In one example, a system for securing UPnP connections may include several modules stored in memory on a network device, including (1) a detection module that detects an attempt by a remote device to establish a connection with a client device within the local network via a UPnP protocol, (2) an identification module that identifies a forwarding rule applied by the network device on the client device based at least in part on an identity of the client device, (3) a determination module that determines at least one restriction placed on UPnP connections between the client device and remote devices by the forwarding rule, (4) an enforcement module that enforces the restriction on the connection attempted by the remote device with the client device via the UPnP protocol in response to the determination of the restriction placed on UPnP connections between the client device and remote devices by the forwarding rule, and (5) at least one physical processor that executes the detection module, the identification module, the determination module, and the enforcement module.

In some examples, the above-described method may be encoded as computer-readable instructions on a non-transitory computer-readable medium. For example, a computer-readable medium may include one or more computer-executable instructions that, when executed by at least one processor of a computing device, cause the computing device to (1) detect, by a network device within a local network, an attempt by a remote device to establish a connection with a client device within the local network via a UPnP protocol, (2) identify a forwarding rule applied by the network device on the client device based at least in part on an identity of the client device, (3) determine at least one restriction placed on UPnP connections between the client device and remote devices by the forwarding rule, and then in response to determining the restriction placed on UPnP connections between the client device and remote devices by the forwarding rule, (4) enforce the restriction on the connection attempted by the remote device with the client device via the UPnP protocol.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
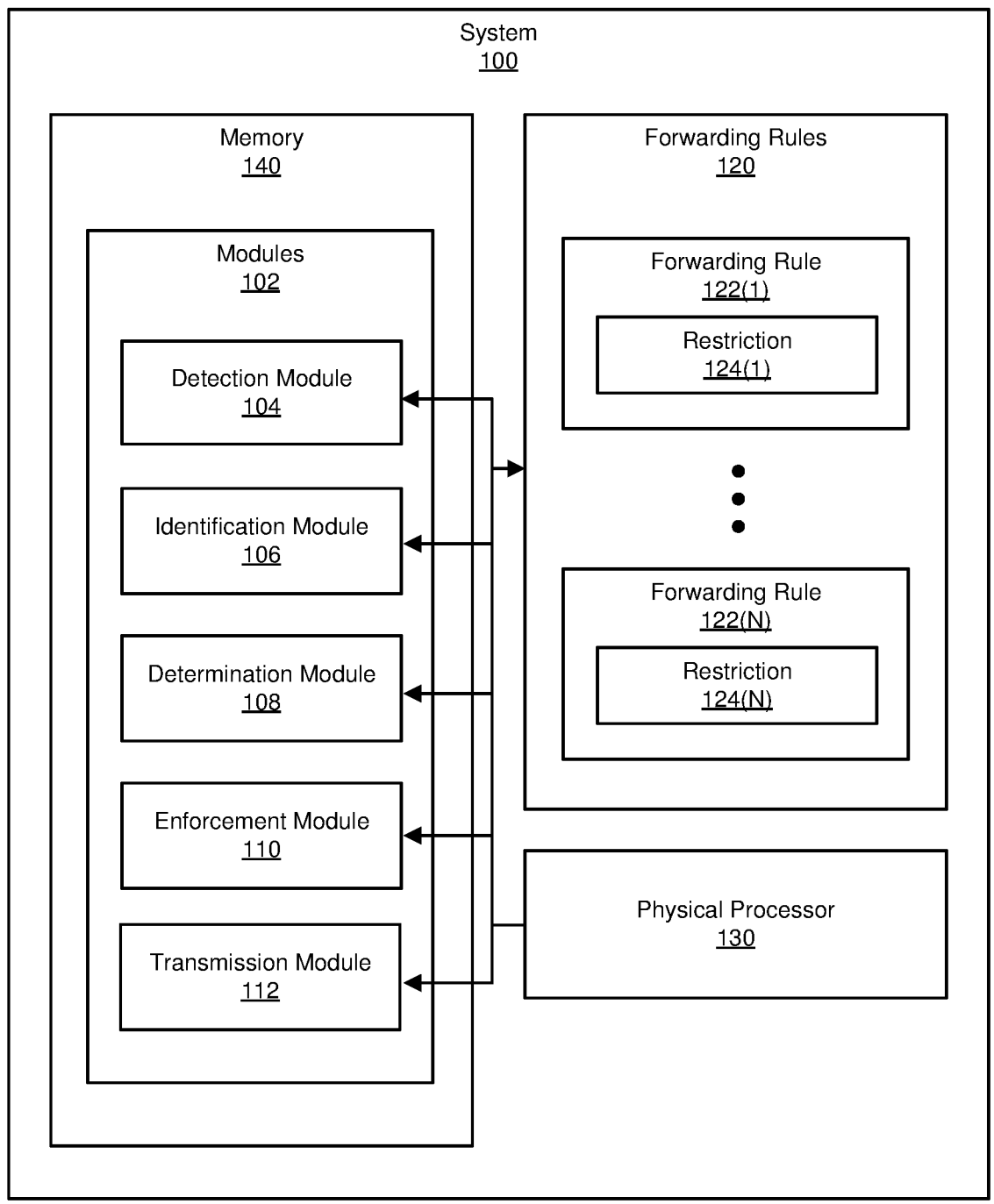
FIG. 1 is a block diagram of an example system for securing UPnP connections.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for securing UPnP connections. As described in greater detail below, a remote device may attempt to establish a connection with a client device within a location network via the UPnP protocol in a certain context (such as media streaming, gaming, smart home monitoring, etc.). By identifying a forwarding rule that applies to the client device in that context, the systems and methods disclosed herein may apply that forwarding rule to the UPnP connection between the client device and the remote device to restrict and/or allow certain traffic transferred from one to the other.

For example, the systems and methods described herein may detect a request from a tablet device to open a UPnP port on a router within a local network. In this example, the systems and methods described herein may determine that tablet devices generally have no reason to create UPnP connections (based at least in part on, e.g., a default profile for tablet devices). As a result, these systems and methods may deny the tablet device's request and/or prevent the tablet device from creating UPnP connections via the router.

As another example, the systems and methods described herein may detect a request from a surveillance cam to open a UPnP port on a router within a local network. In this example, the systems and methods described herein may determine that surveillance cams generally have reasons to create UPnP connections (based at least in part on, e.g., a default profile for surveillance cams). As a result, these systems and methods may satisfy the surveillance cam's request and/or configure a port on the router for a UPnP connection with the surveillance cam.

Accordingly, the systems and methods may be able to improve the security of UPnP devices themselves, network devices (such as routers) that facilitate traffic in connection with UPnP devices, and/or other client devices connected to the same network as UPnP devices. Additionally or alternatively, the systems and methods may be able to improve authentication measures implemented in connection with UPnP devices and/or any other devices that issue a request to open a UPnP port on a router.

Figure 2:
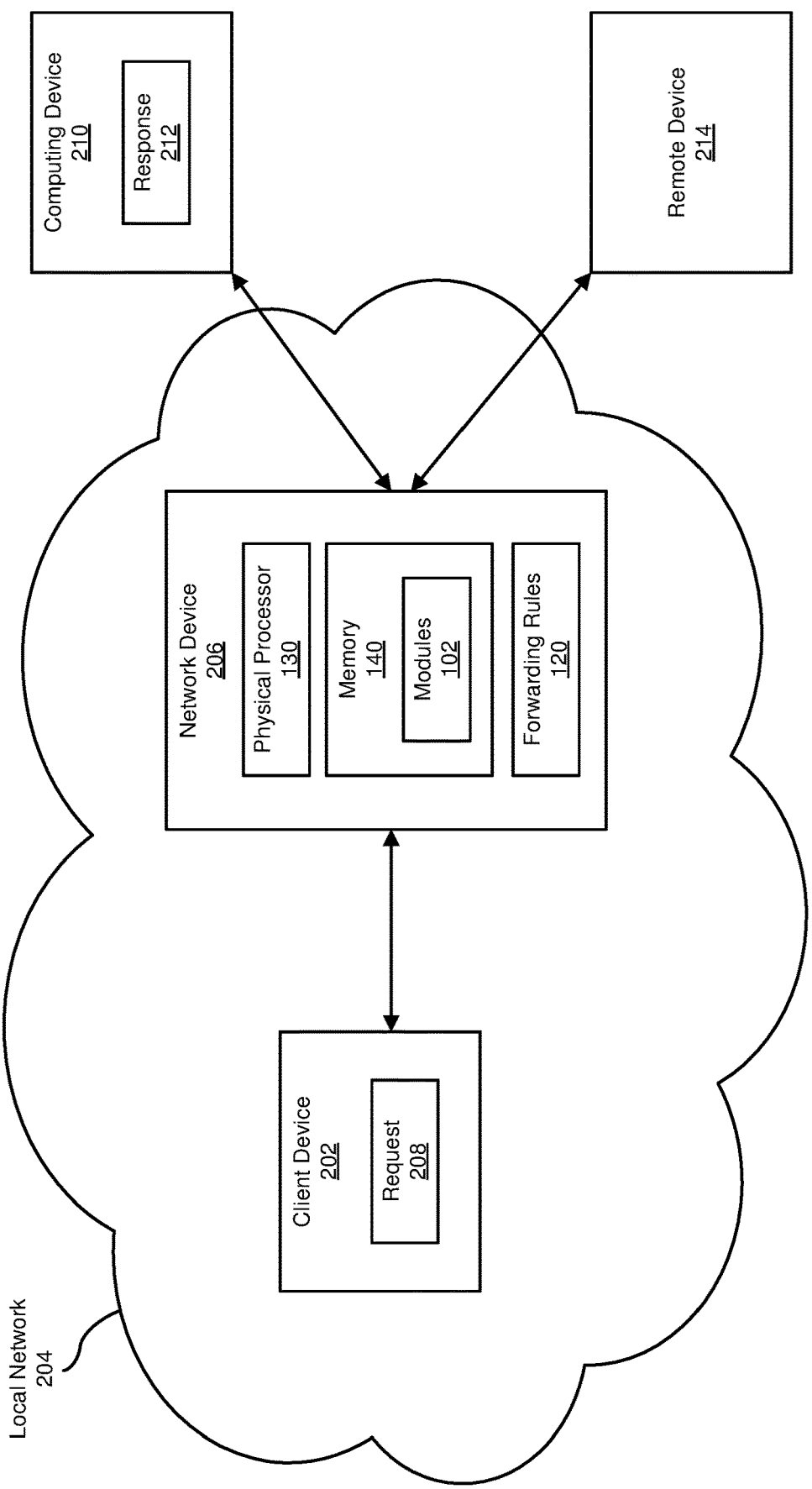
FIG. 2 is a block diagram of an additional example system for securing UPnP connections.

The following will provide, with reference to FIGS. 1 and 2, detailed descriptions of example systems for securing UPnP connections. Detailed descriptions of corresponding computer-implemented methods will be provided in connection with FIG. 3. Detailed descriptions of an example request, an example default profile, and another example default profile will be provided in connection with FIGS. 4, 5, and 6, respectively. In addition, detailed descriptions of an example computing system and network architecture capable of implementing one or more of the embodiments described herein will be provided in connection with FIGS. 7 and 8, respectively.

FIG. 1 is a block diagram of an example system 100 for securing universal plug and play connections. As illustrated in this figure, example system 100 may include one or more modules 102 for performing one or more tasks. As will be explained in greater detail below, modules 102 may include a detection module 104, an identification module 106, a determination module 108, an enforcement module 110, and a transmission module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., network device 206 and/or computing device 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate securing UPnP connections. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more forwarding rules, such as forwarding rules 120. Forwarding rules 120 generally represent any type or form of rule, logic, instruction, and/or regulation applied to traffic originating from and/or destined for a certain computing device within a network. In one example, forwarding rules 120 may include forwarding rules 122(1)-(N). In this example, forwarding rule 122(1) may include a restriction 124(1) placed on UPnP connections between a client device within a local network and remote devices outside the local network. Additionally or alternatively, forwarding rule 122(N) may include a restriction 124(N) placed on UPnP connections between another client device within the local network and remote devices outside the local network.

Example system 100 in FIG. 1 may be implemented in a variety of ways. For example, all or a portion of example system 100 may represent portions of example system 200 in FIG. 2. As shown in FIG. 2, system 200 may include a local network 204, a computing device 210, and a remote device 214. In this example, local network 204 may include and/or represent a client device 202 and a network device 206.

In one example, all or a portion of the functionality of modules 102 may be performed by network device 206, computing device 210, and/or any other suitable computing system. As will be described in greater detail below, one or more of modules 102 from FIG. 1 may, when executed by at least one processor of network device 206, enable network device 206 to secure UPnP connections. For example, and as will be described in greater detail below, one or more of modules 102 may cause network device 206 to (1) detect an attempt by remote device 214 to establish a connection with client device 202 within local network 204 via the UPnP protocol, (2) identify forwarding rule 122(1) as being applied by network device 206 on client device 202 based at least in part on the identity of client device 202, (3) determine that restriction 124(1) is placed on UPnP connections between client device 202 and remote devices by forwarding rule 122(1), and then in response to that determination, (4) enforce restriction 124(1) on the connection attempted by remote device 214 with client device 202 via the UPnP protocol.

Client device 202, computing device 210, and remote device 214 each generally represent any type or form of computing device capable of reading computer-executable instructions. In one example, client device 202 may include and/or represent a baby monitor, a webcam, a surveillance cam, a gaming computer, an Internet of Things (IoT) device, a home alarm system or sensor, and/or a smart home device (such as a smart thermostat, a smart vent, etc.). Examples of client device 202, computing device 210, and remote device 214 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices.

Network device 206 generally represents any type or form of computing device, system, and/or mechanism that facilitates the flow of network traffic within a network and/or across networks. In some examples, network device 206 may each include and/or represent a router (such as a home network router and/or customer edge router). Additional examples of network device 206 include, without limitation, gateways, switches, hubs, modems, bridges, repeaters, multiplexers, network adapters, network interfaces, network racks, chasses, servers, computing devices, virtual machines running on one or more of the same, portions of one or more of the same, variations or combinations of one or more of the same, and/or any other suitable network device.

Local network 204 generally represents any medium or architecture capable of facilitating communication or data transfer. In one example, local network 204 may facilitate communication between client device 202 and remote devices via network device 206. In this example, local network 204 may facilitate communication or data transfer using wireless and/or wired connections. Examples of local network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not necessarily illustrated in this way in FIG. 2, local network 204 may also include and/or represent various other computing devices in addition to client device 202 and network device 206.

Figure 3:
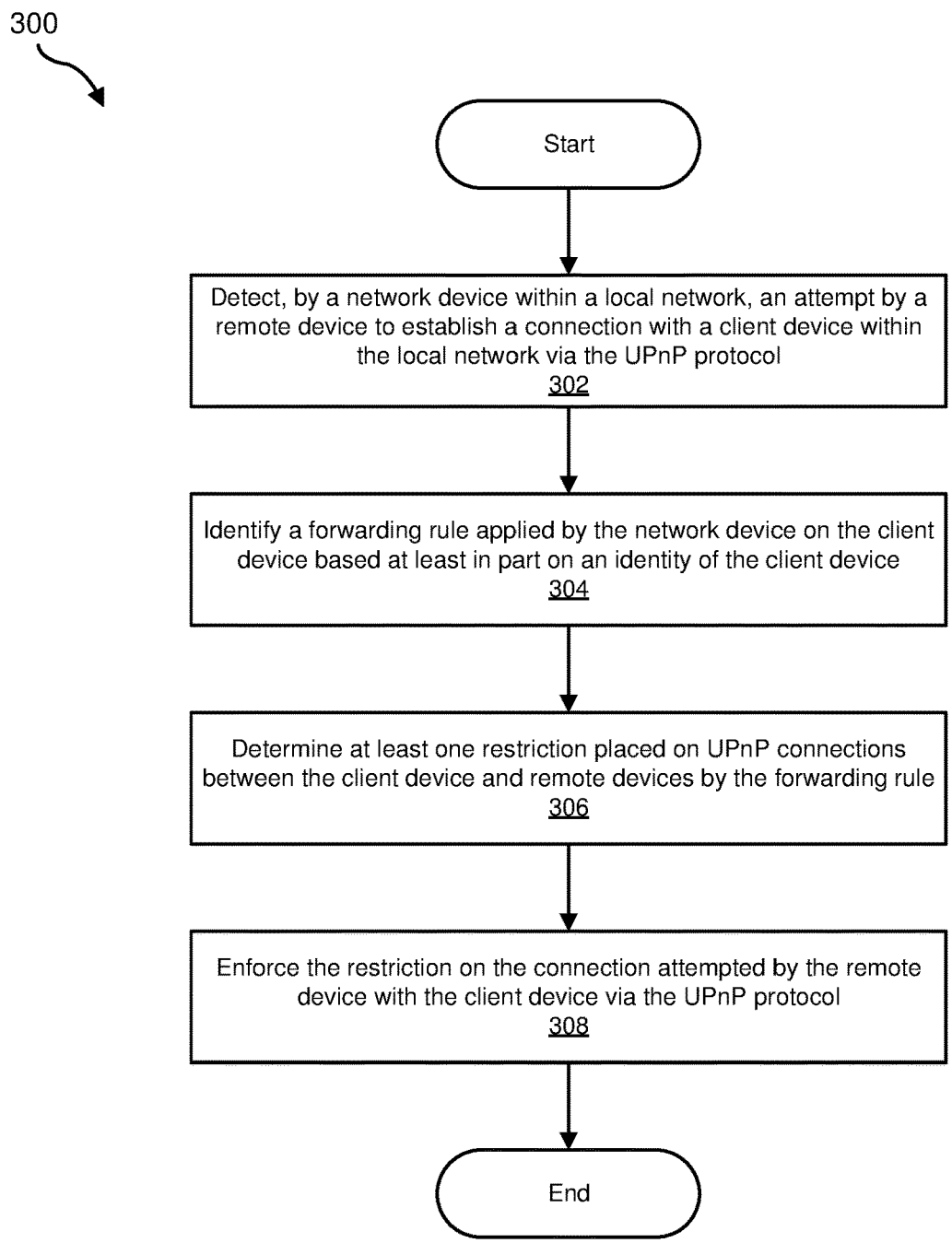
FIG. 3 is a flow diagram of an example method for securing UPnP connections.

FIG. 3 is a flow diagram of an example computer-implemented method 300 for securing UPnP connections. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect an attempt by a remote device to establish a connection with a client device within the local network via the UPnP protocol. For example, detection module 104 may, as part of network device 206 in FIG. 2, detect an attempt by remote device 214 to establish a connection with client device 202 within local network 204 via the UPnP protocol. In one example, the attempted connection may include and/or represent a communication channel that facilitates exchanging traffic via a UPnP port that has been opened and/or configured on network device 206.

The systems described herein may perform step 302 in a variety of different ways and/or contexts. In some examples, detection module 104 may detect the attempt by monitoring a UPnP port that has been opened and/or configured on network device 206. For example, client device 202 may have transmitted a request to network device 206. In this example, the request may have directed network device 206 to open and/or configure a UPnP port to facilitate UPnP connections between client device 202 and remote devices located outside local network 204. In the event that network device 206 satisfies the request by opening and/or configuring the UPnP port, detection module 104 may monitor the UPnP port for any attempts to establish a UPnP connection with client device 202 via that port.

In some examples, client device 202 may generate a request 208 in FIG. 2 and transmit the same to network device 206. In one example, request 208 may direct network device 206 to open and/or configure a certain port to facilitate UPnP connections between client device 202 and remote devices located outside local network 204. In this example, determination module 108 may determine or have already determined the identity of client device 202. The identity may include and/or involve the type or technology category of client device 202, the make and/or model of client device 202, at least one feature (e.g., gaming capabilities and/or video streaming capabilities) of client device 202, and/or an address of client device 202.

In one example, identification module 106 may identify the type and/or technology category of client device 202. For example, identification module 106 may identify client device 202 as being a laptop, a tablet, a baby monitor, a surveillance cam, a gaming computer, an Internet of Things (IoT) device, a home alarm system or sensor, and/or a smart home device (such as a smart thermostat, a smart vent, etc.). Additionally or alternatively, identification module 106 may identify the make and/or model of client device 202. Identification module 106 may also identify an Internet Protocol (IP) address and/or a Media Access Control (MAC) address of client device 202. Determination module 108 may then determine the identity of client device 202 based at least in part on any of this identity information.

In one example, identification module 106 may identify a forwarding rule that applies to client device 202 based at least in part on the identity of client device 202. For example, in the event that client device 202 is a baby monitor, identification module 106 may identify forwarding rule 122(1) as applying to all baby monitors by default. In response to identifying forwarding rule 122(1), enforcement module 110 may enforce and/or apply forwarding rule 122(1) on client device 202 such that any UPnP connections and/or traffic involving client device 202 are subject to restriction 124(1).

In one example, identification module 106 may identify the context, nature, and/or purpose of the application that initiated request 208 on client device 202. For example, identification module 106 may identify the application that initiated request 208 as being a baby monitoring app and/or a surveillance app. Determination module 108 may then determine that forwarding rule 122(1) applies to client device 202 based at least in part on the context, nature, and/or purpose of the baby monitoring app and/or surveillance app that initiated request 208. As a result, identification module 106 may identify forwarding rule 122(1) as applying to client device 202. In response, enforcement module 110 may enforce and/or apply forwarding rule 122(1) on client device 202 such that any UPnP connections and/or traffic involving client device 202 are subject to restriction 124(1).

In some examples, the forwarding rule that applies to the particular device may depend on a combination of the identity of that particular device and the application requesting the UPnP port. In one example, determination module 108 may determine that the combination of the identities of the device and the requesting application calls and/or qualifies for a certain forwarding rule. For example, determination module 108 may determine that an IoT device should never request to open and/or configure a UPnP port on network device 206 in the context of and/or with the purpose of gaming (e.g., streaming video games). Accordingly, in the event that client device 202 is an IoT device requesting a UPnP port for gaming, identification module 106 may identify a forwarding rule that restricts and/or denies such a connection to client device 202.

Figure 4:
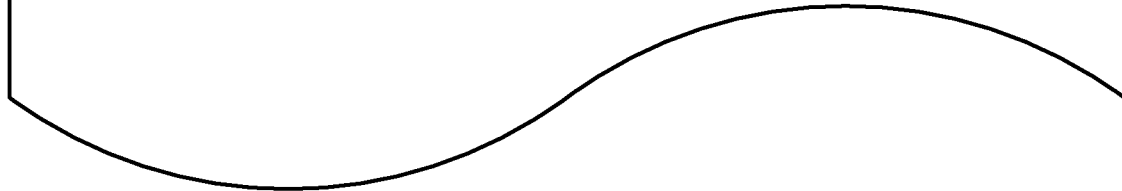
FIG. 4 is an illustration of an example request to open a UPnP port on a router.

As a specific example, network device 206 may receive request 208 in FIG. 4 from client device 202. As illustrated in FIG. 4, request 208 may identify the IP address of the requesting device (in this example, "192.168.0.1"), the request itself (in this example, "Configure UPnP Port"), and/or the context of the request (in this example, "Stream-related Game Server Hosting"). In this example, identification module 106 may identify the type and/or technology category of the requesting device by fingerprinting the same. For example, determination module 108 may determine the identity of the requesting device by analyzing traffic originating from and/or destined for the device whose IP address within local network 204 is 192.168.01.

Figure 5:
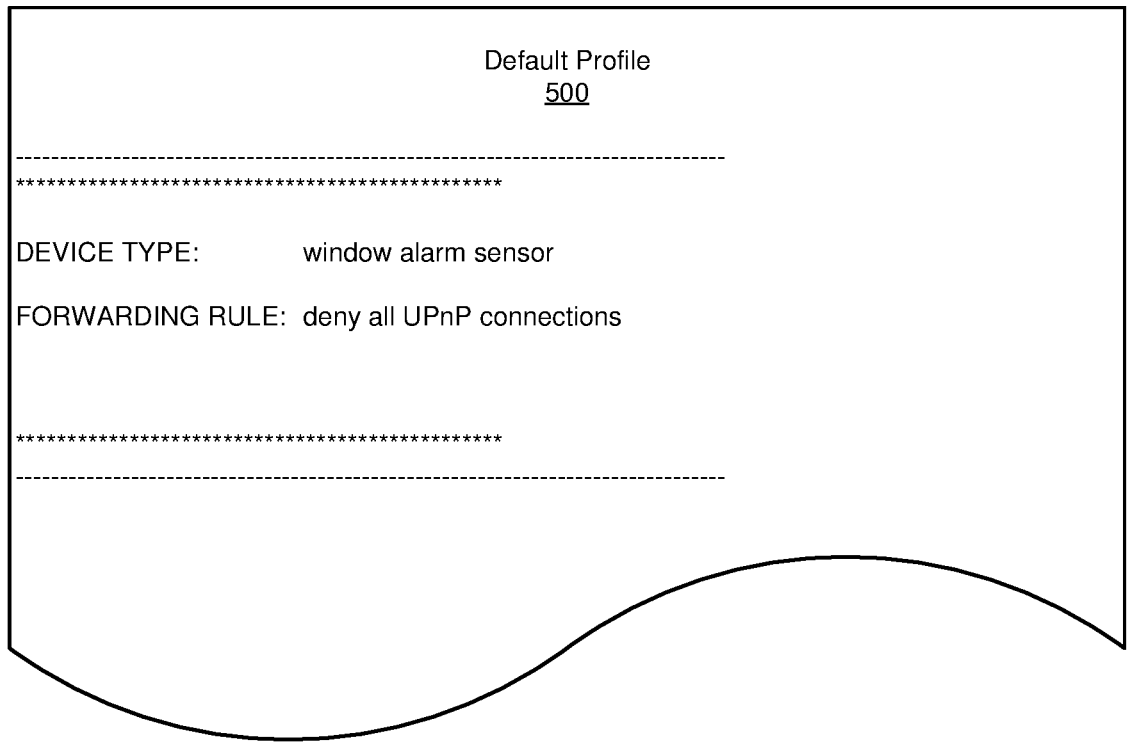
FIG. 5 is an illustration of an example default profile that includes a forwarding rule for a certain type of client device.

As another example, network device 206 may create and/or apply a default profile 500 in FIG. 5. As illustrated in FIG. 5, default profile 500 may identify the type and/or technology category of the devices to which default profile 500 applies (in this example, "window alarm sensor") and/or the corresponding forwarding rule (in this example, "deny all UPnP connections"). Accordingly, in the event that network device 206 receives a request from a window alarm sensor to configure a UPnP port, enforcement module 110 may deny the request by refusing to configure the UPnP port for the window alarm sensor.

Figure 6:
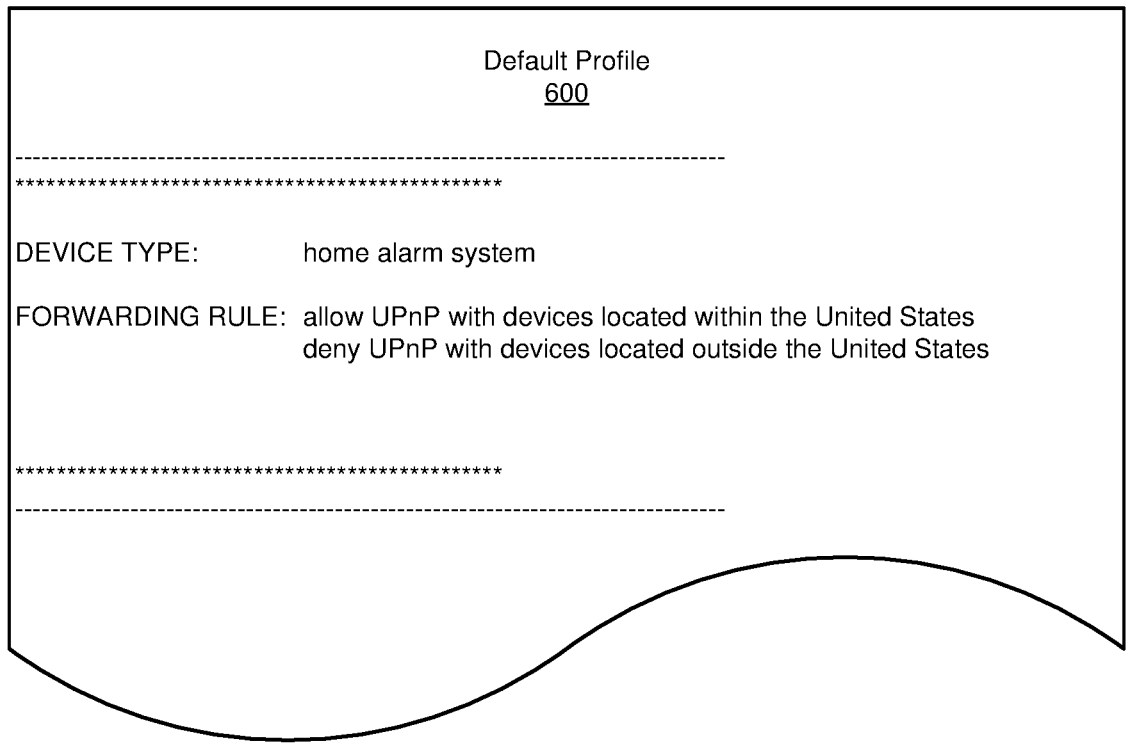
FIG. 6 is an illustration of an example default profile that includes a forwarding rule for a certain type of client device.

As a further example, network device 206 may create and/or apply a default profile 600 in FIG. 6. As illustrated in FIG. 5, default profile 600 may identify the type and/or technology category of the devices to which default profile 600 applies (in this example, "home alarm system") and/or the corresponding forwarding rule (in this example, "allow UPnP with devices located within the United States" and "deny UPnP with devices located outside the United States"). Accordingly, in the event that network device 206 receives a request from a home alarm system to configure a UPnP port, enforcement module 110 may selectively allow UPnP connections with the home alarm system via that UPnP port. More specifically, enforcement module 110 may enable a UPnP connection between the home alarm system and remote devices that are located within the United States. However, enforcement module 110 may direct network device 206 to deny a UPnP connection between the home alarm system and remote devices that are located outside the United States.

In some examples, an administrator (e.g., a home owner) may override any default forwarding rules for certain client devices. For example, detection module 104 may receive request 208 from client device 202 to open a UPnP port to facilitate UPnP connections between client device 202 and remote devices. In this example, transmission module 112 may, as part of network device 206 in FIG. 2, transmit a notification indicating that client device 202 is requesting to open a UPnP port to facilitate UPnP connections. This notification may be destined for computing device 210 owned and/or operated by the administrator of local network 204. Although FIG. 2 illustrates computing device 210 as being external to local network 204, other embodiments may involve computing device 210 being internal to and/or part of local network 204.

This notification may include and/or identify a variety of information. For example, the notification may specify the identity of client device 202, the default forwarding rule that corresponds to the identity of client device 202, the context and/or nature of the application that initiated request 208 on client device 202, and/or an indication as to whether client device 202 (e.g., the make and/or model of client device 202) and/or the application would be expected to initiate such a request to open UPnP ports.

In this example, the administrator may make a decision as to whether to allow or deny UPnP connections with client device 202. Additionally or alternatively, the administrator may decide to allow UPnP connections with certain restrictions and/or under certain conditions. Accordingly, the administrator may modify and/or override any existing and/or default forwarding rule or restriction for UPnP connections with client device 202. The administrator may also create a new forwarding rule or restriction for UPnP connections with client device 202.

In one example, the administrator may direct computing device 210 to transmit a response 212 in FIG. 2 to the notification. In this example, response 212 may indicate whether to satisfy request 208 to open the UPnP port to facilitate UPnP connections. Computing device 210 may transmit response 212 to network device 206. As response 212 arrives at network device 206, detection module 104 may receive response 212.

In one example, response 212 may instruct network device 206 to satisfy request 208 by opening the UPnP port to facilitate UPnP connections. As a result, enforcement module 110 may satisfy request 208 by opening the UPnP port.

In another example, response 212 may instruct network device 206 to deny request 208 by refusing to open the UPnP port for UPnP connections with client device 202. In this example, enforcement module 110 may deny request 208 by refusing to open the certain port for UPnP connections based at least in part on response 212.

In an additional example, response 212 may instruct network device 206 to place a restriction on UPnP connections between client device 202 and remote devices in connection with the forwarding rule. In this example, enforcement module 110 may place the restriction on UPnP connections between client device 202 and remote devices based at least in part on response 212.

Returning to FIG. 3, at step 304 one or more of the systems described herein may identify a forwarding rule applied by the network device on the client device based at least in part on the identity of the client device. For example, identification module 106 may, as part of network device 206 in FIG. 2, identify forwarding rule 122(1) applied by network device 206 on client device 202. In this example, forwarding rule 122(1) may be applied to traffic originating from and/or destined for client device 202 based at least in part on the identity of client device 202.

The systems described herein may perform step 304 in a variety of different ways and/or contexts. In some examples, identification module 106 may search forwarding rules 120 for a forwarding rule that applies to client devices of a certain type and/or technology category. During this search, identification module 106 may identify forwarding rule 122(1) as applying to the type and/or technology category of client device 202.

Additionally or alternatively, identification module 106 may search forwarding rules 120 for a forwarding rule that applies to the application that initiated the request to open the UPnP port by which remote device 214 is attempting to establish a UPnP connection with client device 202. During this search, identification module 106 may identify forwarding rule 122(1) as applying to such an application.

In some examples, identification module 106 may search forwarding rules 120 for a forwarding rule that applies to the combination of the device type and the requesting application. During this search, identification module 106 may identify forwarding rule 122(1) as applying to the type and/or technology category of client device 202 and the application that initiated the request to open the UPnP port.

In some examples, identification module 106 may search for a default profile that corresponds to client device 202. During this search, identification module 106 may identify default profile 500 or 600 as applying to the type and/or technology category of client device 202. Identification module 106 may then identify at least one forwarding rule that is included in the corresponding default profile.

Returning to FIG. 3, at step 306 one or more of the systems described herein may determine at least one restriction placed on UPnP connections between the client device and remote devices by the forwarding rule. For example, determination module 108 may, as part of network device 206 in FIG. 2, determine that restriction 124(1) is placed on UPnP connections between client device 202 and any remote devices by the forwarding rule. In other words, any traffic (whether incoming or outgoing) that network device 206 forwards in connection with client device 202 may be subject to restriction 124(1). Examples of restriction 124(1) include, without limitation, time limits, restricted times of day, restricted days of week, schedules, restricted geolocations of remote devices, blacklisted IP addresses of remote devices, restricted users on client devices within the local network, required users on client devices within the local network, required thresholds of reputation and/or hygiene for remote devices, variations or combinations of one or more of the same, or any other suitable restriction.

The systems described herein may perform step 306 in a variety of different ways and/or contexts. In some examples, determination module 108 may determine that restriction 124(1) is placed on UPnP connections involving client device 202 by confirming that forwarding rule 122(1) is applied to client device 202. Upon making that confirmation, determination module 108 may make the determination that restriction 124(1) is placed on UPnP connections because restriction 124(1) corresponds to forwarding rule 122(1).

In some examples, determination module 108 may determine that restriction 124(1) prevents any UPnP connections between client device 202 and remote devices located outside local network 204. In one example, determination module 108 may determine that restriction 124(1) prevents UPnP connections involving client device 202 after a certain time limit (e.g., 3 hours per day) of use has transpired. In another example, determination module 108 may determine that restriction 124(1) prevents UPnP connections involving client device 202 during certain hours of the day. Additionally or alternatively, determination module 108 may determine that restriction 124(1) prevents UPnP connections between client device 202 and remote devices with blacklisted IP addresses.

In one example, determination module 108 may determine that restriction 124(1) prevents UPnP connections between client device 202 and remote devices whose reputation does not reach a certain threshold. In other words, restriction 124(1) may prevent UPnP connections between client device 202 and remote devices with poor reputation and/or poor hygiene. In another example, determination module 108 may determine that restriction 124(1) prevents UPnP connections involving client device 202 unless a certain user is logged into and/or operating client device 202 or remote device 214.

Returning to FIG. 3, at step 308 one or more of the systems described herein may enforce the restriction on the connection attempted by the remote device with the client device via the UPnP protocol. For example, enforcement module 110 may, as part of network device 206 in FIG. 2, enforce restriction 124(1) on the connection attempted by remote device 214 with client device 202 via the UPnP protocol. In one example, the UPnP connection between client device 202 and remote device 214 may actually be established. In another example, the UPnP connection between client device 202 and remote device 214 may be attempted but never established.

The systems described herein may perform step 308 in a variety of different ways and/or contexts. In some examples, enforcement module 110 may enforce restriction 124(1) prior to the actual establishment of a UPnP connection between client device 202 and remote device 214. In other examples, enforcement module 110 may enforce restriction 124(1) after the successful establishment of a UPnP connection between client device 202 and remote device 214.

In some examples, enforcement module 110 may enforce restriction 124(1) by preventing the UPnP connection between client device 202 and remote device 214 from being established. In one example, determination module 108 may determine that remote device 214 is located in a restricted geolocation. As a result, enforcement module 110 may prevent the UPnP connection between client device 202 and remote device 214 from being established.

In another example, determination module 108 may determine that remote device 214 has a reputation that does not reach a certain threshold. As a result, enforcement module 110 may prevent the UPnP connection between client device 202 and remote device 214 from being established.

In a further example, determination module 108 may determine that remote device 214 has a blacklisted IP address or is known to be malicious. As a result, enforcement module 110 may prevent the UPnP connection between client device 202 and remote device 214 from being established.

Figure 7:
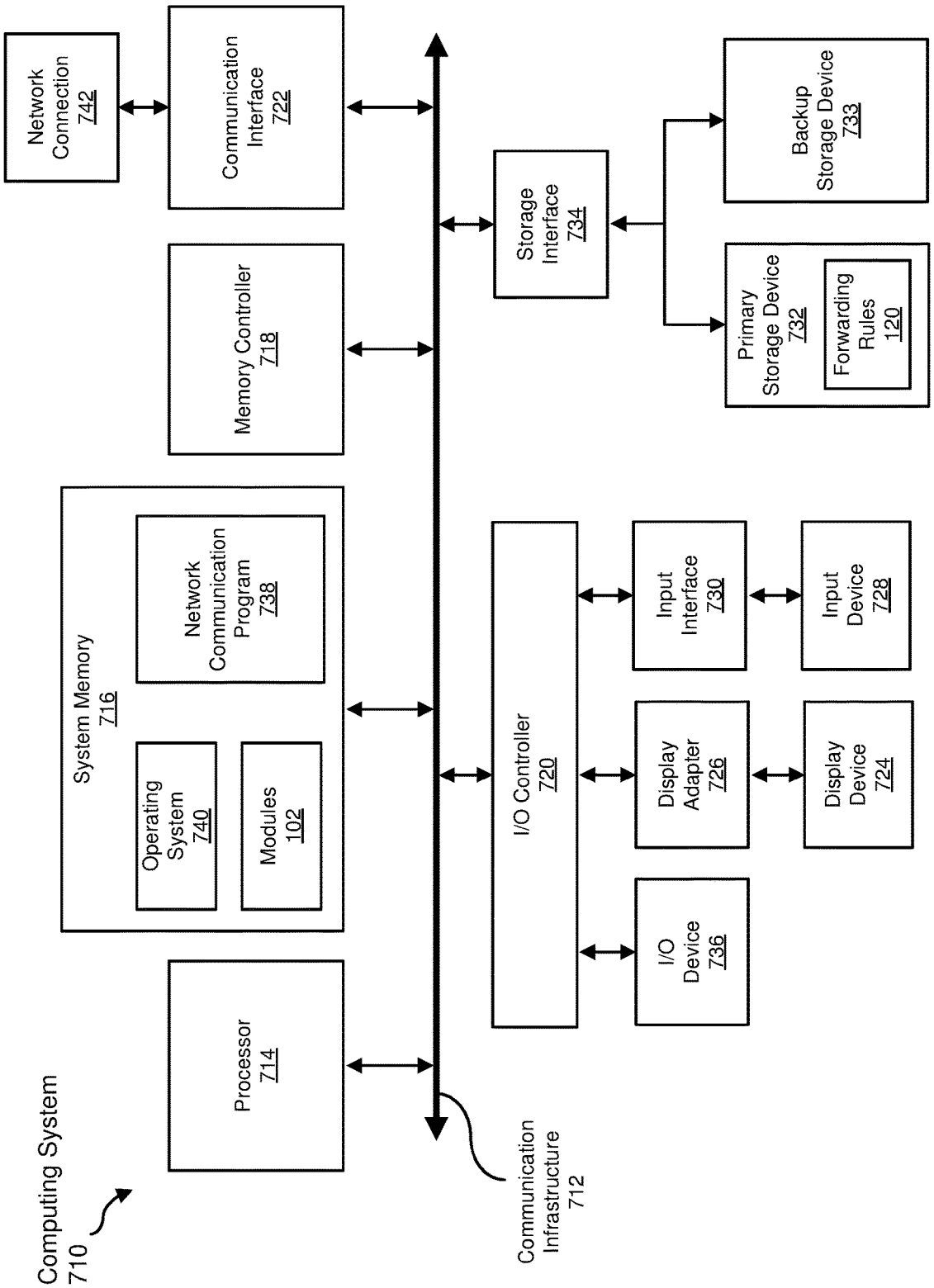
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, forwarding rules 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
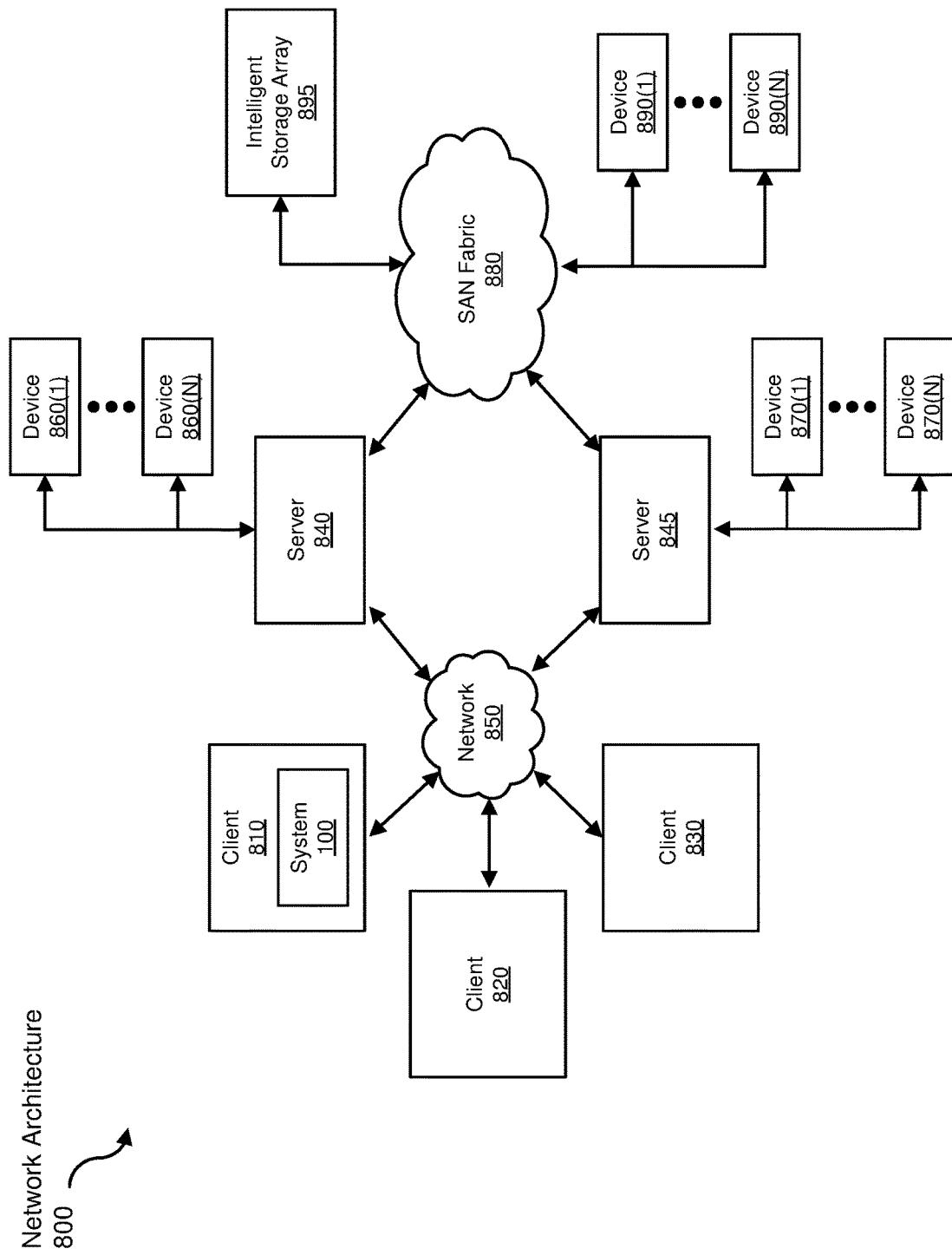
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for securing Universal Plug and Play connections.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing Universal Plug and Play connections, at least a portion of the method being performed by a computing device comprising at least one processor, the method comprising:

creating, for client devices of a certain technology category within a local network, a default profile that includes a forwarding rule to be applied to traffic involving any client devices of the certain technology category within the local network, wherein the client devices of the certain technology category comprise at least one of:
a baby monitor;
a surveillance cam;
an Internet of Things (IoT) device;
a home alarm system or sensor;
a smart home device;
a webcam device; and
a gaming device;
creating, for client devices of an additional technology category within the local network, an additional default profile that includes an additional forwarding rule to be applied to traffic involving any client devices of the additional technology category within the local network;
receiving, by a network device within the local network, a request from a client device within the local network to open a certain port to facilitate Universal Plug and Play (UPnP) connections between the client device and remote devices;
transmitting, to an administrator of the local network, a notification indicating that the client device is requesting to open the certain port to facilitate UPnP connections;
receiving, from the administrator, a response indicating whether to satisfy the request to open the certain port to facilitate UPnP connections;
detecting, by the network device within the local network, an attempt by a remote device to establish a connection with the client device within the local network via a UPnP a Universal Plug and Play (UPnP) protocol;
determining that the client device within the local network is of the certain technology category;
in response to determining that the client device is of the certain technology category, applying the default profile to the connection between the client device and the remote device;
identifying the forwarding rule as being included in the default profile applied to the connection between the client device and the remote device;
determining, based at least in part on the default profile, that the forwarding rule places at least one restriction on UPnP connections between any client devices of the certain technology category within the local network and remote devices, wherein determining the restriction placed on UPnP connections between the client device and remote devices comprises determining that the restriction prevents UPnP connections between the client device and remote devices located in a certain geolocation; and
in response to determining that the forwarding rule places the restriction on UPnP connections between any client devices of the certain technology category within the local network and remote devices, enforcing the restriction on the connection attempted by the remote device with the client device via the UPnP protocol due at least in part to the client device being of the certain technology category within the local network, wherein enforcing the restriction on the connection attempted by the remote device with the client device comprises:
determining that the remote device attempting to establish the connection with the client device is located in the certain geolocation; and
preventing the connection between the client device and the remote device from being established due at least in part to the certain geolocation of the remote device.

2. The method of claim 1, further comprising:
receiving, by the network device, a request from the client device to open a certain port to facilitate UPnP connections between the client device and remote devices;
determining an identity of the client device;
identifying the forwarding rule to be applied to the client device based at least in part on the identity of the client device; and
upon identifying the forwarding rule, applying the forwarding rule on the client device such that any UPnP connections with the client device are subject to the restriction.

3. The method of claim 2, further comprising identifying a context of an application that initiated the request to open the certain port; and
wherein identifying the forwarding rule to be applied to the client device comprises identifying the forwarding rule based at least in part on the context of the application that initiated the request to open the certain port.

4. The method of claim 2, wherein the response instructs the network device to satisfy the request by opening the certain port to facilitate UPnP connections; and
further comprising satisfying the request by opening the certain port to facilitate UPnP connections based at least in part on the response.

5. The method of claim 2, wherein the response instructs the network device to deny the request by refusing to open the certain port for UPnP connections; and
further comprising denying the request by refusing to open the certain port for UPnP connections based at least in part on the response.

6. The method of claim 2, wherein the response identifies the restriction placed on UPnP connections between the client device and remote devices; and
wherein enforcing the restriction on the connection attempted by the remote device with the client device comprises placing the restriction on UPnP connections between the client device and remote devices based at least in part on the response.

7. The method of claim 2, wherein the notification transmitted to the administrator specifies at least one of:
the identity of the client device;
the forwarding rule as corresponding to the identity of the client device;
a context of an application that initiated the request on the client device; and
an indication as to whether the client device is expected to initiate requests to open ports to facilitate UPnP connections.

8. The method of claim 2, wherein the identity of the client device comprises at least one of:
the certain technology category of the client device;
a make or model of the client device;
at least one feature of the client device; and
an address of the client device.

9. The method of claim 1, wherein:
determining the restriction placed on UPnP connections between the client device and remote devices comprises determining that the restriction prevents any UPnP connections between the client device and remote devices; and
enforcing the restriction on the connection attempted by the remote device with the client device comprises preventing the connection between the client device and the remote device from being established.

10. The method of claim 1, wherein:
determining the restriction placed on UPnP connections between the client device and remote devices comprises determining that the restriction prevents UPnP connections between the client device and remote devices with blacklisted addresses; and
enforcing the restriction on the connection attempted by the remote device with the client device comprises:
determining that the remote device attempting to establish the connection with the client device has a blacklisted address; and
preventing the connection between the client device and the remote device from being established due at least in part to the remote device having the blacklisted address.

11. The method of claim 1, wherein:
determining the restriction placed on UPnP connections between the client device and remote devices comprises determining that the restriction prevents UPnP connections between the client device and remote devices whose reputations do not reach a certain threshold; and
enforcing the restriction on the connection attempted by the remote device with the client device comprises:
determining that the remote device attempting to establish the connection with the client device has a reputation that does not reach the certain threshold; and
preventing the connection between the client device and the remote device from being established due at least in part to the remote device having the reputation that does not reach the certain threshold.

12. A system for securing Universal Plug and Play connections, the system comprising:
a default profile created for client devices of a certain technology category within a local network, wherein the default profile includes a forwarding rule to be applied to traffic involving any client devices of the certain technology category within the local network, wherein the client devices of the certain technology category comprise at least one of:
a baby monitor;
a surveillance cam;
an Internet of Things (IoT) device;
a home alarm system or sensor;
a smart home device;
a webcam device; and
a gaming device;
an additional default profile created for client devices of an additional technology category within the local network, wherein the additional default profile includes an additional forwarding rule to be applied to traffic involving any client devices of the additional technology category within the local network;
a detection module, stored in memory on a network device within the local network, that receives a request from a client device within the local network to open a certain port to facilitate Universal Plug and Play (UPnP) connections between the client device and remote devices;
a transmission module, stored in memory on the network device, that transmits, to an administrator of the local network, a notification indicating that the client device is requesting to open the certain port to facilitate UPnP connections;
wherein the detection module further:
receives, from the administrator, a response indicating whether to satisfy the request to open the certain port to facilitate UPnP connections; and detects an attempt by a remote device to establish a connection with the client device within the local network via a UPnP a Universal Plug and Play (UPnP) protocol;

a determination module, stored in memory on the network device, that determines that the client device within the local network is of the certain technology category;

an enforcement module, stored in memory on the network device, that applies the default profile to the connection between the client device and the remote device in response to the determination that the client device is of the certain technology category;

an identification module, stored in memory on the network device, that identifies the forwarding rule as being included in the default profile applied to the connection between the client device and the remote device;

wherein the determination module determines, based at least in part on the default profile, that the forwarding rule places at least one restriction on UPnP connections between any client devices of the certain technology category within the local network and remote devices, wherein determining the restriction placed on UPnP connections between the client device and remote devices comprises:

determining that the restriction prevents UPnP connections between the client device and remote devices located in a certain geolocation; and determining that the remote device attempting to establish the connection with the client device is located in the certain geolocation;

wherein the enforcement module enforces, due at least in part to the client device being of the certain technology category within the local network, the restriction on the connection attempted by the remote device with the client device via the UPnP protocol in response to the determination that the forwarding rule places the restriction on UPnP connections between any client devices of the certain technology category within the local network and remote devices, wherein enforcing the restriction on the connection attempted by the remote device with the client device comprises preventing the connection between the client device and the remote device from being established due at least in part to the certain geolocation of the remote device; and at least one physical processor that executes the detection module, the identification module, the transmission module, the determination module, and the enforcement module.

13. The system of claim 12, wherein:

the detection module receives a request from the client device to open a certain port to facilitate UPnP connections between the client device and remote devices;

the determination module determines an identity of the client device;

the identification module identifies the forwarding rule to be applied to the client device based at least in part on the identity of the client device; and the enforcement module applies the forwarding rule on the client device such that any UPnP connections with the client device are subject to the restriction.

14. The system of claim 12, wherein:

the response instructs the network device to satisfy the request by opening the certain port to facilitate UPnP connections; and the enforcement module satisfies the request by opening the certain port to facilitate UPnP connections based at least in part on the response.

15. A non-transitory computer-readable medium comprising one or more computer-executable instructions that, when executed by at least one processor of a network device computing device, cause the network computing device to:

create, for client devices of a certain technology category within a local network, a default profile that includes a forwarding rule to be applied to traffic involving any client devices of the certain technology category within the local network, wherein the client devices of the certain technology category comprise at least one of:

a baby monitor;

a surveillance cam;

an Internet of Things (IoT) device;

a home alarm system or sensor;

a smart home device;

a webcam device; and a gaming device;

create, for client devices of an additional technology category within the local network, an additional default profile that includes an additional forwarding rule to be applied to traffic involving any client devices of the additional technology category within the local network;

receive a request from a client device within the local network to open a certain port to facilitate Universal Plug and Play (UPnP) connections between the client device and remote devices;

transmit, to an administrator of the local network, a notification indicating that the client device is requesting to open the certain port to facilitate UPnP connections;

receive, from the administrator, a response indicating whether to satisfy the request to open the certain port to facilitate UPnP connections;

detect, by network device within the local network, an attempt by a remote device to establish a connection with the client device within the local network via a UPnP a Universal Plug and Play (UPnP) protocol;

determine that the client device within the local network is of the certain technology category;

apply the default profile to the connection between the client device and the remote device in response to determining that the client device is of the certain technology category;

identify the forwarding rule as being included in the default profile applied to the connection between the client device and the remote device;

determine, based at least in part on the default profile, that the forwarding rule places at least one restriction on UPnP connections between any client devices of the certain technology category within the local network and remote devices, wherein determining the restriction placed on UPnP connections between the client device and remote devices comprises determining that the restriction prevents UPnP connections between the client device and remote devices located in a certain geolocation; and enforce, due at least in part to the client device being of the certain technology category within the local network, the restriction on the connection attempted by the remote device with the client device via the UPnP protocol in response to the determination that the forwarding rule places the restriction on UPnP connections between any client devices of the certain technology category within the local network and remote devices, wherein enforcing the restriction on the connection attempted by the remote device with the client device comprises:

determining that the remote device attempting to establish the connection with the client device is located in the certain geolocation; and preventing the connection between the client device and the remote device from being established due at least in part to the certain geolocation of the remote device.

\* \* \* \* \*